(12) United States Patent
Kamble et al.

(10) Patent No.: US 9,166,869 B2
(45) Date of Patent: Oct. 20, 2015

(54) MANAGEMENT OF DISTRIBUTED NETWORK SWITCHING CLUSTER

(71) Applicant: INTERNATIONAL BUSINESS MACHINES CORPORATION, Armonk, NY (US)

(72) Inventors: Keshav G. Kamble, Fremont, CA (US); Kumbhare P. Abhijit, San Jose, CA (US); Vijoy A. Pandey, San Jose, CA (US); Nandakumar Peethambaram, Santa Clara, CA (US); Simarbir Singh, Plano, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 13/741,081

(22) Filed: Jan. 14, 2013

(65) Prior Publication Data
US 2014/0198686 A1      Jul. 17, 2014

(51) Int. Cl.
H04L 12/24       (2006.01)
(52) U.S. Cl.
CPC ................... H04L 41/044 (2013.01)
(58) Field of Classification Search
USPC .......... 370/225, 236, 254; 709/213, 223, 224
See application file for complete search history.

(56) References Cited

U.S. PATENT DOCUMENTS

| | | | |
|---|---|---|---|
| 2009/0141703 A1* | 6/2009 | Ghodrat et al. | 370/352 |
| 2011/0261825 A1 | 10/2011 | Ichino | |
| 2011/0317559 A1 | 12/2011 | Kern et al. | |
| 2011/0317701 A1 | 12/2011 | Yamato et al. | |
| 2012/0110055 A1* | 5/2012 | Van Biljon et al. | 709/201 |
| 2013/0028091 A1* | 1/2013 | Sun et al. | 370/236 |
| 2013/0124707 A1* | 5/2013 | Ananthapadmanabha et al. | 709/223 |
| 2013/0128746 A1* | 5/2013 | Yedavalli | 370/238 |

FOREIGN PATENT DOCUMENTS

| | | |
|---|---|---|
| WO | 2012049807 A1 | 4/2012 |
| WO | 2012156832 A1 | 11/2012 |

OTHER PUBLICATIONS

International Search Report dated Apr. 15, 2014 received in PCT/IB2013/059654.
Durairaj, R. et al., Multi-Tenancy Isolation in Datacenter Networks, IP.com, Oct. 25, 2011.
Tootoonchian, A. et al.; OpenTM: Traffic Matrix Estimator for Open Flow Networks, INSPEC, 2010.
Bianco, A. et al.; OpenFlow Switching: Data Plane Performance, INSPEC, 2010.

* cited by examiner

*Primary Examiner* — Awet Haile
(74) *Attorney, Agent, or Firm* — Shimokaji IP

(57) ABSTRACT

Management of a network may be provided by moving management functions from each switch in a network cluster into a locally controlled server. The management functions may be organized into an Ethernet distributed fabric switching protocol (E-DFP) based management plane. Control functions of each switch may also be organized into a control plane. The management plane and control plane of the network may be moved from each switch and integrated into the server. Efficiency in network switching may be provided by releasing the switches of their management and control responsibilities and centralizing these responsibilities to the server. In some embodiments, the server may be outside the cluster.

14 Claims, 7 Drawing Sheets

MANAGEMENT OF DISTRIBUTED NETWORK SWITCHING CLUSTER

BACKGROUND

The present invention relates to network management, and more specifically, to management of a distributed network switching cluster.

As networks scale, the management responsibilities related to larger networks grows accordingly. Administrators may find it increasingly difficult to manage large scale networks, especially those with switch points that span across physical locations. Management of multiple switches may consume large amounts of resources as data may need to travel from each switch to a control point outside the switch. This may be more apparent in cloud environments where network traffic may span across several network entities.

As may be seen, finding improved efficiency in managing a network in a distributed environment may be desired.

SUMMARY

According to one embodiment of the present invention, a system comprises a plurality of switches in a cluster. The plurality of switches may be enabled to operate under an Ethernet distributed fabric switching protocol (E-DFP). A management function of each switch in the cluster may be organized into a management plane. A server may be coupled to the cluster. The server may be configured to include a virtualized form of the management plane controlled by a controller in the server operating under the E-DFP.

According to another embodiment of the present invention, a server comprises a data storage module, one or more networking ports; and a controller. The controller may be coupled to the data storage module. The controller may include an Ethernet distributed fabric switching protocol (E-DFP) module configured to host on the server, a control plane of a clustered network and locally control a management plane of the clustered network through the one or more networking ports using the E-DFP module.

According to yet another embodiment of the present invention, a computer program product for managing a network element, comprises a computer readable storage medium having computer readable program code embodied therewith. The computer readable program code may configure network switches into a cluster. The computer readable program code may configure management functions of each switch in the cluster into an Ethernet distributed fabric switching protocol (E-DFP) based management plane. The computer readable program code may also control management of the cluster from outside the cluster through the E-DFP based management plane.

According to yet another embodiment of the present invention, a method of managing a network, comprises configuring network switches into a cluster. Management functions of each switch in the cluster may be configured into operating under an Ethernet distributed fabric switching protocol (E-DFP) based management plane. Management of the cluster may be controlled from outside the cluster through the E-DFP based management plane.

DETAILED DESCRIPTION

Figure 1:
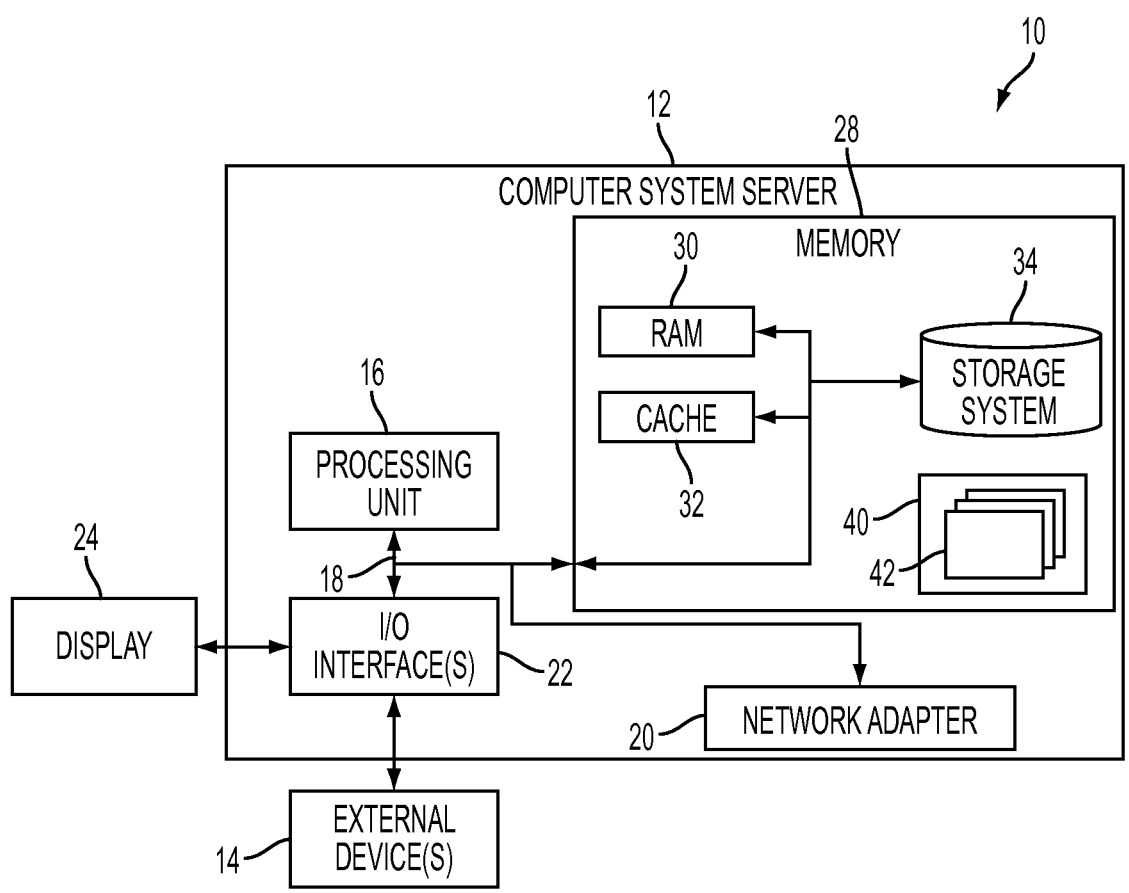
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage media having computer readable program code embodied thereon.

Any combination of one or more computer readable storage media may be utilized.

A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard or pointing device for example; a display 24; one or more devices that enable a user to interact with the computer system/server 12; and/or any devices (e.g., network card, modem, etc.) that enable the computer system/server 12 to communicate with one or more other computing devices, etc. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
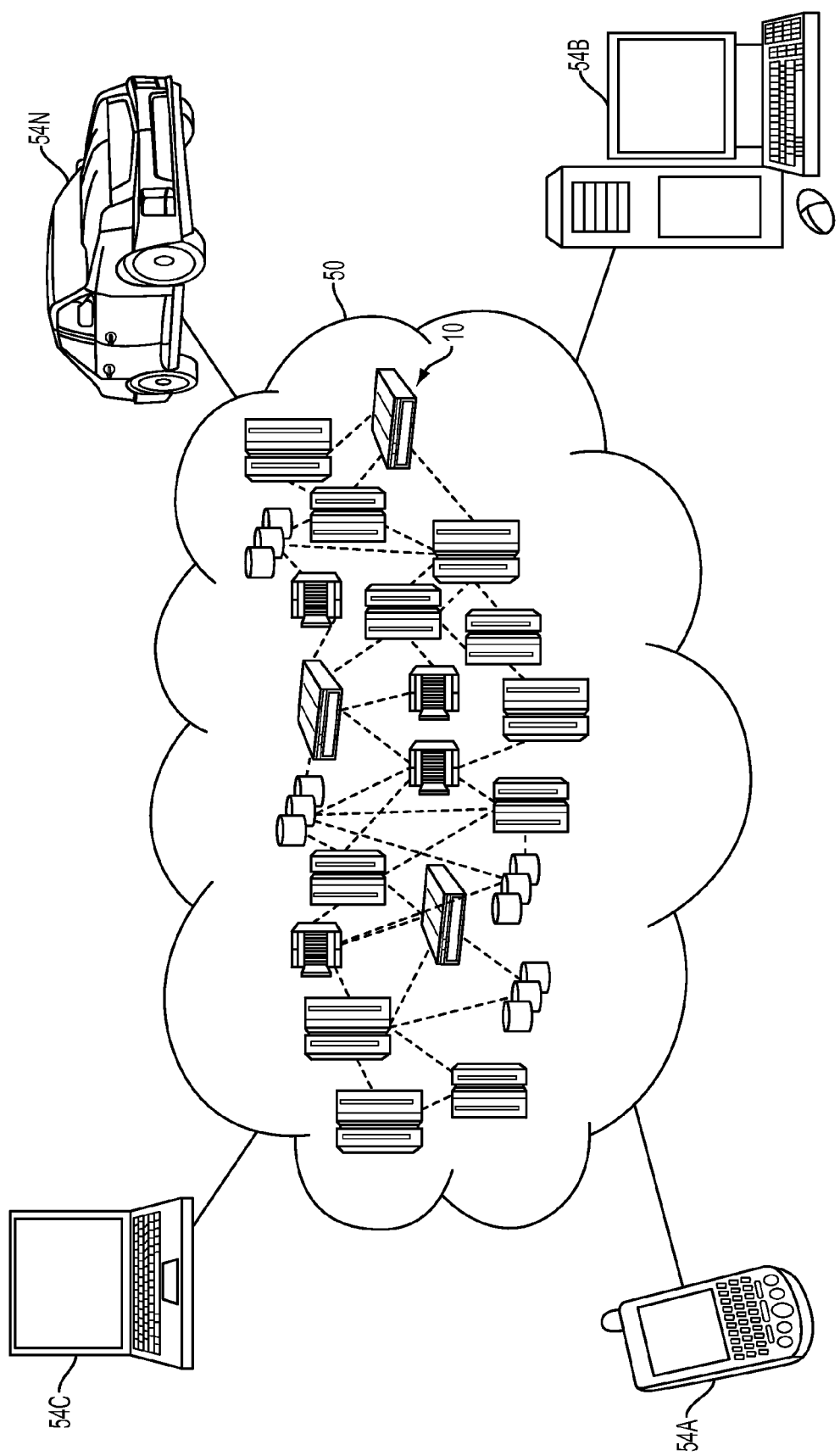
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or an automobile computer system 54N, may communicate. The nodes 10 may communicate with one another. They may be grouped physically or virtually, in one or more networks, such as Private, Community, Public, or Hybrid clouds as described hereinabove, or a combination thereof. This allows the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
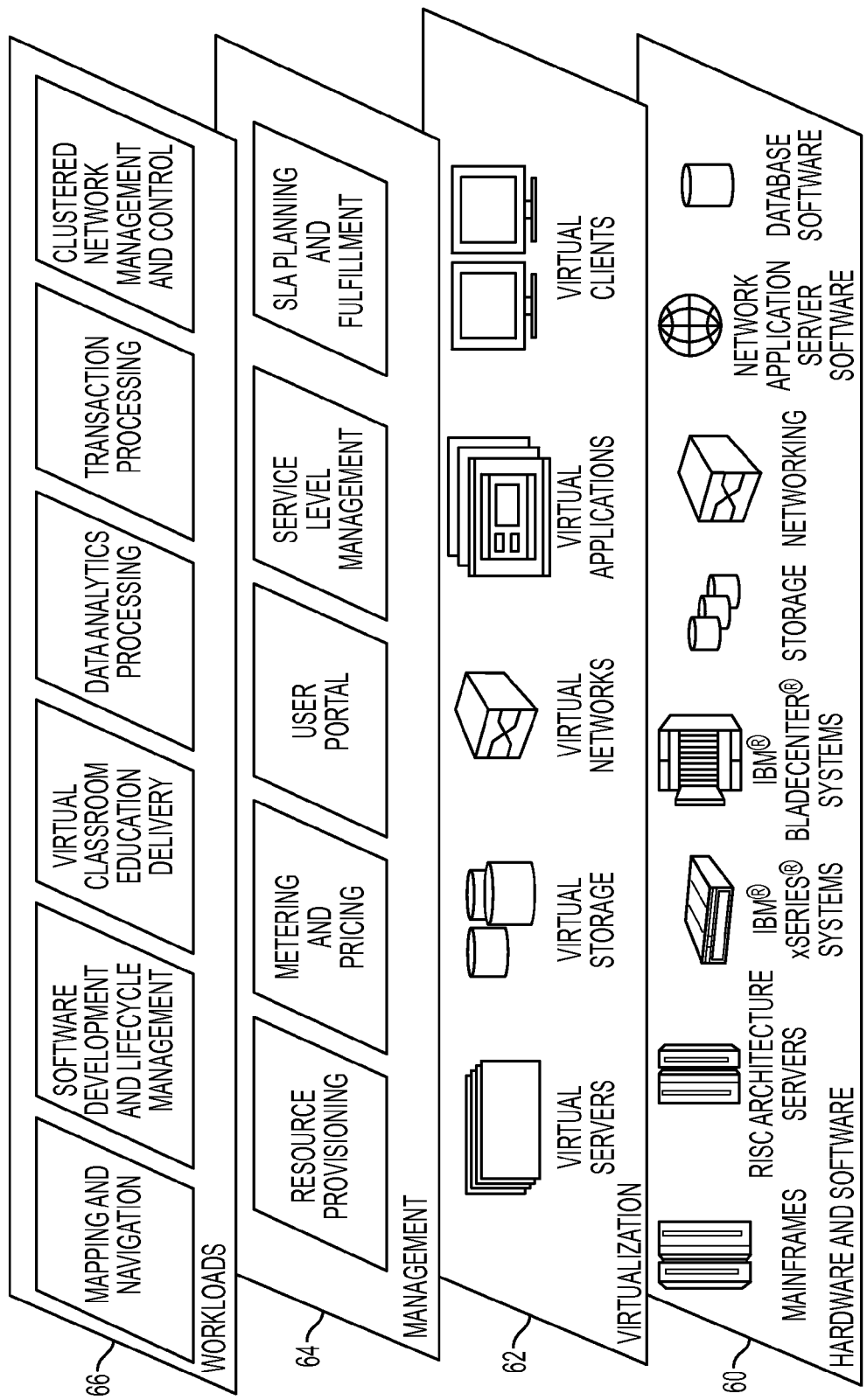
FIG. 3 depicts abstraction model layers according to yet another embodiment of the present invention.

Referring now to FIG. 3, a set of functional abstraction layers provided by the cloud computing environment 50 (FIG. 2) is shown. It should be understood that the components, layers, and functions shown in FIG. 3 are intended to be illustrative only and embodiments of the invention are not limited thereto. As depicted, the following layers and corresponding functions may be provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 may provide functionality for which the cloud computing environment may be utilized. Examples of workloads and functions which may be provided from this layer include: mapping and navigation; software development and lifecycle management; virtual classroom education delivery; data analytics processing; transaction processing; and clustered network management.

In general, embodiments of the present invention move control elements from each member switch in a clustered network to a centralized controller on a server. The controller takes on responsibility as a global control plane of the cluster. Additionally, a master switch function on the server simulates a management plane of the clustered network. The cluster may be virtualized and presented as a multi-slot switching chassis to the management entity.

Figure 4:
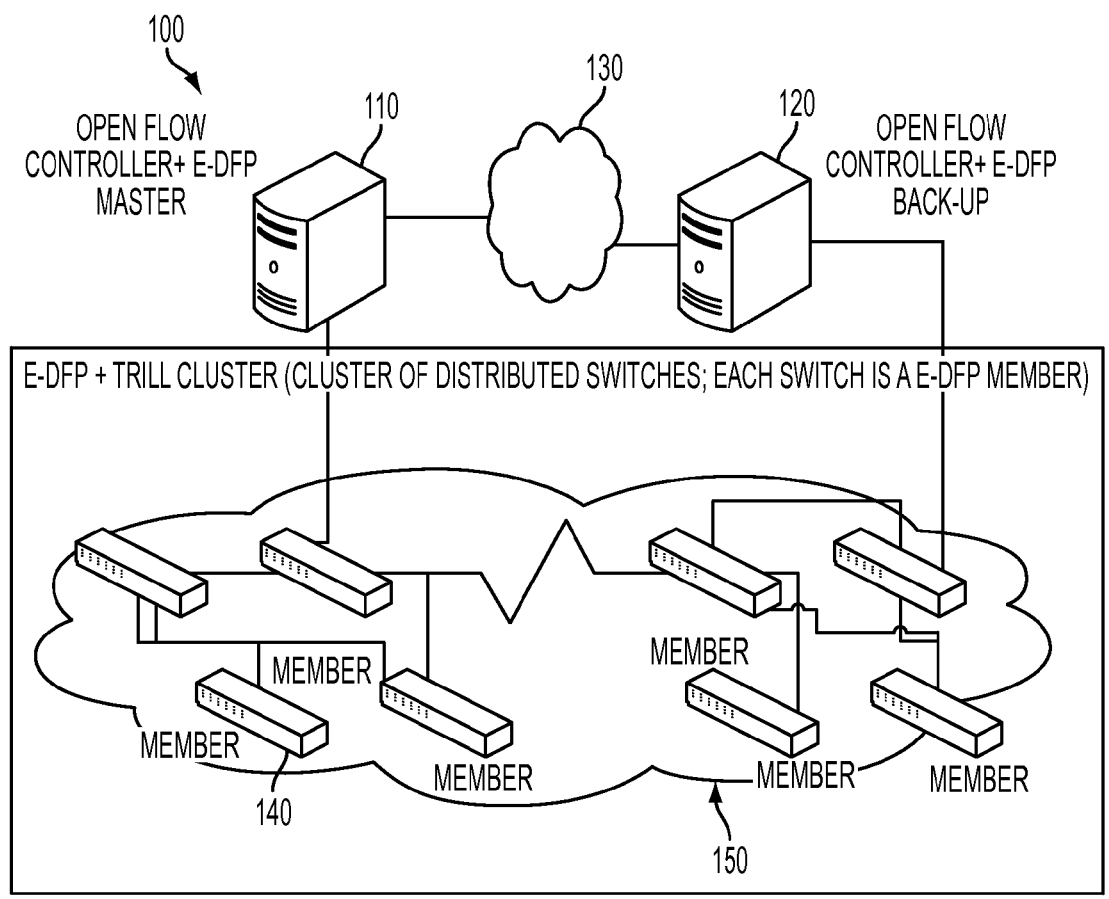
FIG. 4 is a block diagram of a system according to still another embodiment of the present invention.

Referring now to FIG. 4, a system 100 is shown according to an exemplary embodiment of the present invention. The system 100 may include a plurality of switches 140 (sometimes referred to as member switches 140). A master server 110 and a stand-by server 120 may be connected to the plurality of switches 140. The switches 140 may be configured into a distributed switch cluster 150. The cluster 150 may employ a Transparent Interconnect of Lots of Links (TRILL) standard. The cluster 150 may operate under an Ethernet distributed fabric switching protocol (E-DFP). In an exemplary embodiment, the server 110 may be configured as a master switch providing management and control functions of the switches 140 in a centralized locale. In some embodiments, the master server 110 may operate as an OpenFlow enabled control plane. The master server 110 may be connected to the stand-by server 120 through a network 130. The network 130 may be, for example, a cloud computing environment as in the aforementioned description. In an exemplary embodiment, the stand-by server 120 may house redundant information present in the master server 110 so that in the event the master server 110 fails the stand-by server 120 may behave as a master switch for the cluster 150.

Figure 5:
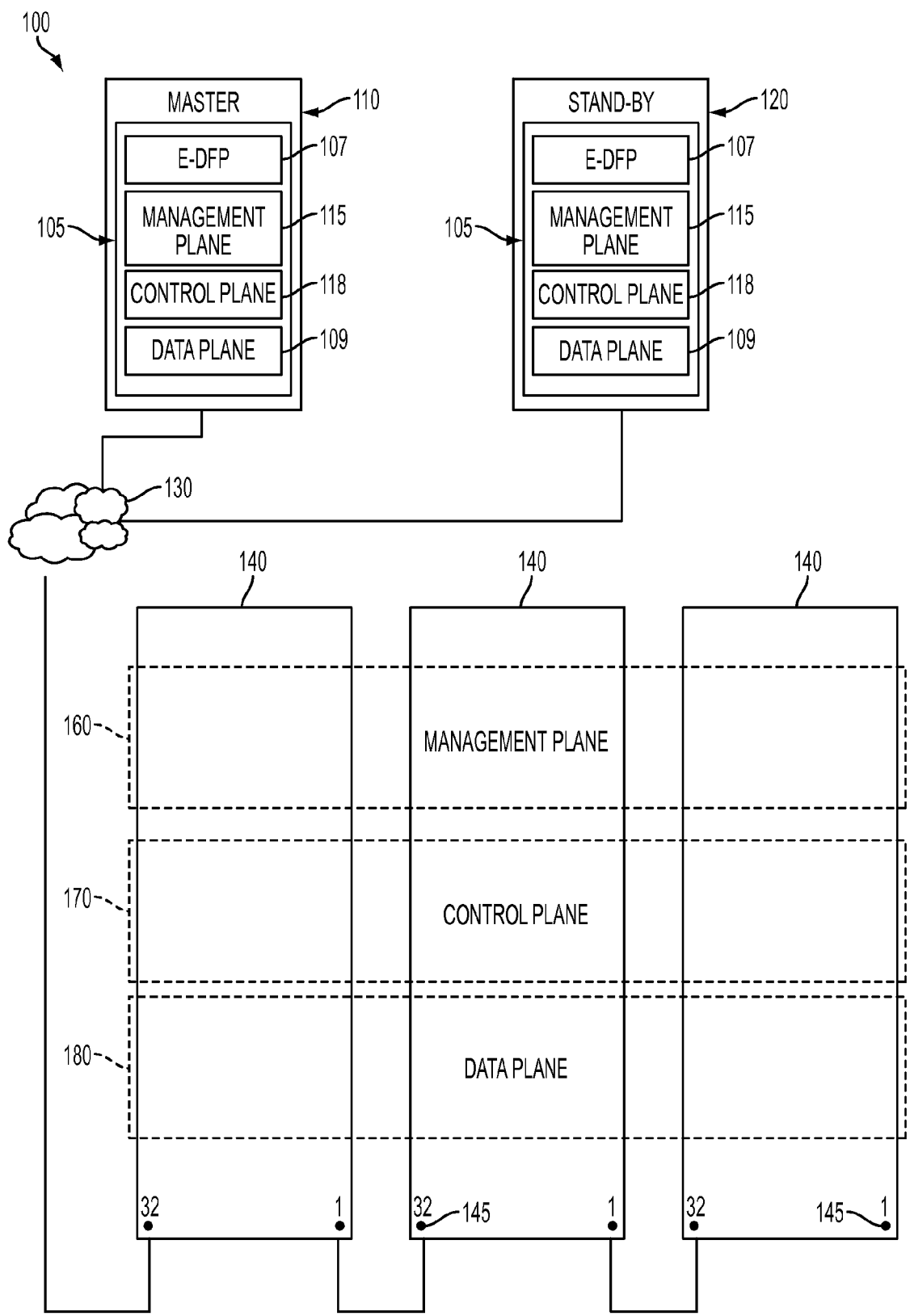
FIG. 5 is a block diagram of the system of FIG. 4 showing plane organization of network switch functions.

Referring now to FIG. 5, the system 100 is shown according to another exemplary embodiment of the present invention. The system 100 is shown with three switches 140 however it will be understood that more or fewer switches may be used. The management functions of the switches 140 may be organized into a management plane 160 common to all the switches 140 in the cluster 150 (FIG. 4). The control functions of the switches 140 may be organized into a control plane 170. The data functions of the switches 140 may be organized into a data plane 180.

The master server 110 may be configured to control the management plane 160, the control plane 170, and the data plane 180. In an exemplary embodiment, the management plane 160 across all switches 140 may be virtualized into a single management plane in the master server 110. The stand-by server 120 may be configured to also control these planes (160, 170, 180) in the event the master server 110 is unable to control the switches 140. For example, the servers 110 and 120 may include a master controller 105. The master controller 105 may combine the functions of an OpenFlow controller with attributes of a master switch operating an E-DFP configured cluster 150. Depending on the role of the master server 110, the master controller 105 may include different functions. For example, when the master server 110 is operating as a switch, the master controller 105 may include an E-DFP module 107, a management plane controller 115, a control plane 118, and a data plane 109. When the master server 110 is operating as a server, the master controller 105 may include the E-DFP module 107, the management plane controller 115, and the control plane 118. In an exemplary embodiment, the master server 110 may employ an OpenFlow protocol when operating as a server. Details of the management plane controller 115 and control plane 118 will be described below. The server 120 may also include copies of the E-DFP module 107, the management plane controller 115, the control plane 118, and the data plane 109.

Each switch 140 may include a plurality of ports 145. For sake of illustration, the switches 145 are shown with only the first and last port 145 (labeled as "1" and "32"). In an exemplary embodiment, the OpenFlow protocol may be used in controlling the switches 140. By employing the OpenFlow protocol, the control plane controller 118 may connect to the switches 140 over a secure channel to provide control plane support to the switches 140.

The member switches 140 may be run as E-DFP member blocks organized into Ethernet switching data planes 180. These blocks may interact with the management plane controller 115 to receive access control list (ACL) entries to be written in the data plane 180. Elements of the data plane 180 may include for example ASIC structures, ports, etc. Network traffic passing through the data plane 180 may be controlled by the control plane controller 118. Each member switch 140 may be viewed as a stack member having some specific defined features and any featureless member may be treated as disabled. Featureless members may not necessarily run any stacking protocol other than E-DFP.

Figure 6:
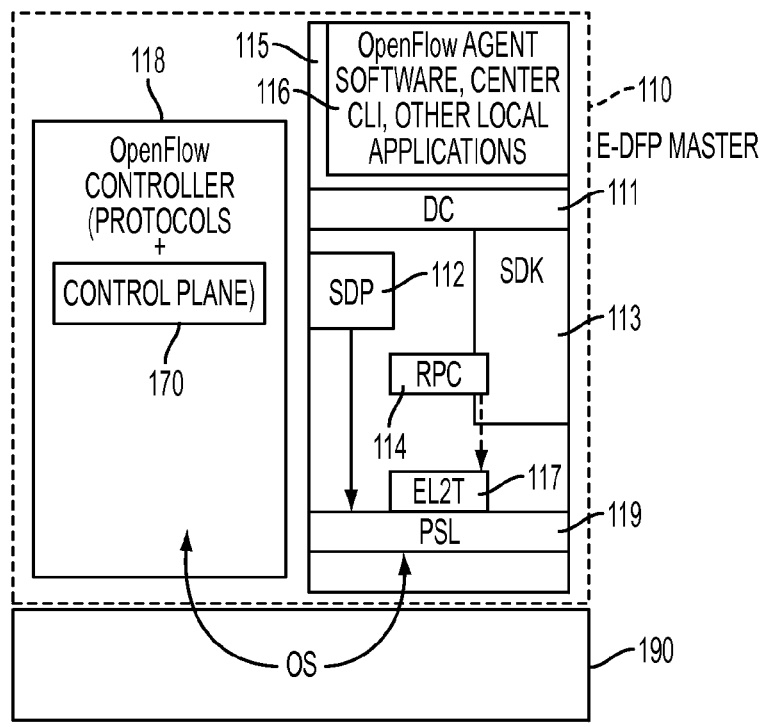
FIG. 6 is a block diagram of a server that may be used in the system of FIG. 5.

Referring now to FIGS. 5 and 6, details of the functionality of the server 110 are shown. The control plane 118 may organize the control elements of each switch 140 into the control plane 170. Elements of the control plane 170 may include for example, bridging/routing protocols. The management plane controller 115 may organize management functions of each switch 140 into the management plane 160. Examples of management functions may include Telnet, Simple Network Management Protocol (SNMP), and other networking management protocols. In some embodiments, the management plane controller 115 may include an OpenFlow agent 116 or other local applications. In addition, managing elements in the management plane controller 115 may include, for example, a data center (DC) 111, a switch discovery protocol (SDP) 112, a software development kit (SDK) 113, a remote procedure call (RPC) 114, an Enhanced Layer 2 Transport Protocol (EL2T) 117 (which may be a low overhead, highly reliable transport protocol employed directly at layer 2), and a path selection layer (PSL) 119. Control of functions within the management plane controller 115 and control plane 118 may be provided by an operating system (OS) 190.

In an exemplary embodiment, the control plane 170 functionality may be moved into the control plane 118. Using the OpenFlow protocol, the control plane 118 may assume the responsibilities of the global control plane 170 of the distributed switching cluster 150. The management plane controller 115 may assume the responsibilities of the management plane 160 of the whole distributed switching cluster 150 within the master server 110. The management plane controller 115 and the control plane 118 may combine E-DFP management support (from the E-DFP module 107) with the OpenFlow protocol to control flow functionality in the cluster 150.

The control plane controller 118 may have a super set of the capabilities available in the member switches 140. For example, the control plane 118 may host all features which are supported by data planes of E-DFP switches plus it can have features which are not supported by some of the E-DFP switches. Hence, to access a particular feature of a particular member switch 140, both the feature and the switch may be specified. The control plane 118 may request the capabilities of the system 100 by sending a feature request to the switch cluster 150. The switches 140 may respond with a feature reply that specifies their capabilities. This may be performed upon the establishment of the OpenFlow protocol.

The control plane 118 may be able to set and query configuration parameters for the switches 140. The control plane 118 may send out a configuration message to the switches 140. The control plane 118, and in some embodiments, the E-DFP specifically, may make the decision as to which member switch 140 to send the message. The switches 140 may respond to the query from the control plane 118 and send their registry.

The management controller 115 may send out messages that manage state on the switches 140. The management controller 115 may modify OpenFlow tables to modify switch port properties. On receiving the messages the member switches 140 may send back a read-state message. The management controller 115 may use these messages to collect statistics from the switches 140.

The control plane 118 may also use packet-out messages to send out packets and use the master switch open flow agent component 116, to forward them to a specific port. Barrier request/reply messages may be used by the control plane 118 to ensure message dependencies have been met or to receive notifications for completed operations.

Figure 7:
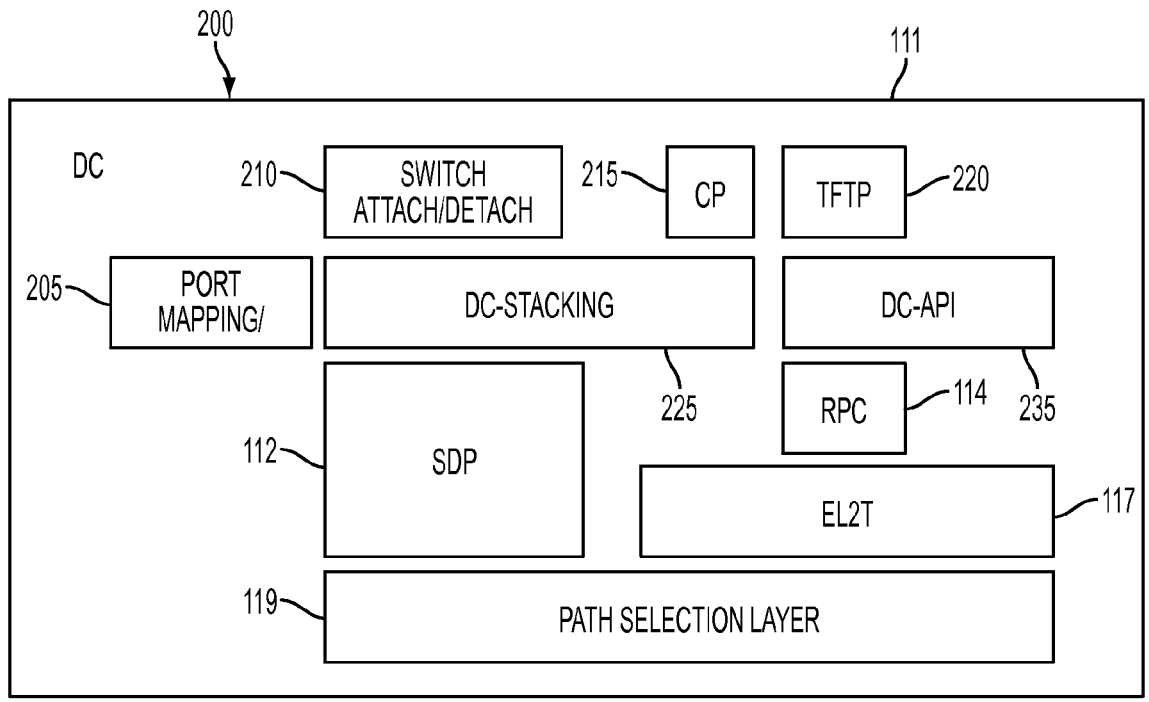
FIG. 7 is a block diagram of an Ethernet distributed switching protocol architecture in a switch according to still another embodiment of the present invention.

Referring now to FIG. 7, an E-DFP switch architecture 200 is shown in accordance with an exemplary embodiment of the present invention. In an exemplary embodiment, the master server 110, stand-by server 120, and the member switches 140 may share the characteristics of the E-DFP switch architecture 200. The data center 111 may house the elements of the E-DFP switch architecture 200. The data center 111 may house some of the same functions as described with respect to the management plane controller 115 shown in FIG. 6 and for clarity those elements will not be repeated. The E-DFP switch architecture 200 may also include a port mapping function 205, a switch attach/detach call 210, a check pointing (CP) function 215 for synchronizing information from the master server 110 to the stand-by server 120, a Trivial File Transfer Protocol (TFTP) 220, and a DC-stacking function 225, a DC-API 235.

Figure 8:
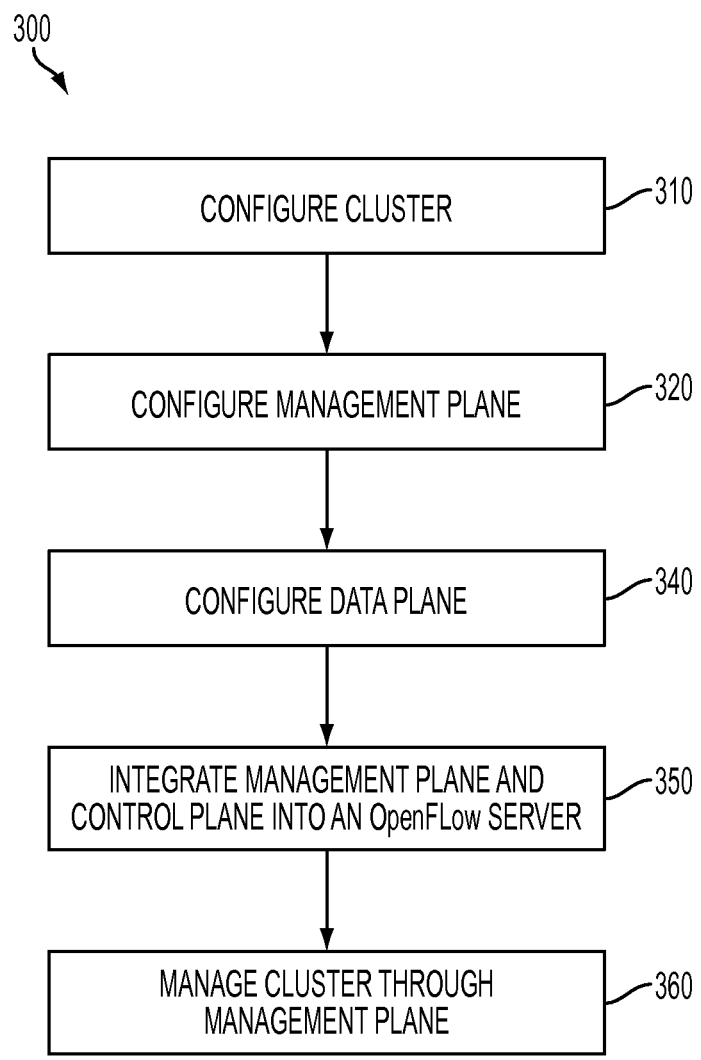
FIG. 8 is a flow chart of a method for managing a network according to still yet another embodiment of the present invention

Referring now to FIG. 8, a method 300 of managing a network is shown according to an exemplary embodiment of the present invention. The method 300 may include a controller configuring in step 310 network switches into a cluster. The controller may configure in step 320 management functions of each switch in the cluster into an E-DFP based management plane. The controller may configure in step 330 data elements of each switch into a data plane. An operating system may integrate in step 340 control of the management plane and control plane into a common server. The common server may operate under the OpenFlow protocol. The controller may control in step 350 management of the cluster from outside the cluster through the management plane.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a plurality of switches in a cluster enabled to operate under an Ethernet distributed fabric switching protocol (E-DFP), wherein a management function of each switch in the cluster is organized into a management plane; wherein the management function includes a telnet protocol to provide a bidirectional interactive text-oriented communication facility; and
    a server coupled to the cluster, the server configured to include a virtualized form of the management plane controlled by a controller in the server operating under the E-DFP, wherein the virtualized form of the management plane provides at least one of: metering and pricing that provides cost tracking as resources are utilized; a user portal; service level management that insures required service levels are met; and service level agreement planning and fulfillment that anticipates future requirements in accordance with a service level agreement.

2. The system of claim 1, wherein the controller uses an Open Flow protocol.

3. The system of claim 1, wherein:
    ports of each switch are organized by the controller into a data plane;
    control elements of each switch are organized by the controller into a control plane hosted on the server; and
    control of data traffic in the data plane is controlled by the control plane.

4. The system of claim 1, including a stand-by server having a back-up controller, the standby server configured to include the virtualized form of the management plane controlled by the back-up controller operating under the E-DFP.

5. A server, comprising:
    a data storage module;
    one or more networking ports; and a controller coupled to the data storage module, the controller including an Ethernet distributed fabric switching protocol (E-DFP) module configured to:

host on the server, a control plane of a clustered network, wherein the control plane is common to a plurality of switches in the clustered network, wherein a management function of each switch in the clustered network is organized into a management plane, and wherein the management function includes a telnet protocol to provide a bidirectional interactive text-oriented communication facility; and locally control the management plane of the clustered network through the one or more networking ports using the E-DFP module, wherein the management plane is common to a plurality of switches in the clustered network.

6. The server of claim 5, wherein the controller uses an Open Flow protocol along with the E-DFP module to control the clustered network.

7. The server of claim 5, wherein the controller is configured to organize ports of the plurality of switches into a data plane.

8. A computer program product for managing a network, the computer program product comprising a computer readable hardware storage medium having computer readable program code embodied therewith, the computer readable program code being configured to:

configure network switches into a cluster;

configure management functions of each switch in the cluster into an Ethernet distributed fabric switching protocol (E-DFP) based management plane, wherein the management functions include a telnet protocol to provide a bidirectional interactive text-oriented communication facility; and control management of the cluster from outside the cluster through the E-DFP based management plane.

9. The computer program product of claim 8, wherein the computer readable program code is configured to use an OpenFlow protocol to control a control plane of the cluster.

10. The computer program product of claim 8, wherein the E-DFP based management plane is located in a server outside of the cluster.

11. A method of managing a network, comprising:

configuring network switches into a cluster operating under an Ethernet distributed fabric switching protocol (E-DFP);

configuring management functions of each switch in the cluster into an E-DFP based management plane, wherein the management functions include a telnet protocol to provide a bidirectional interactive text-oriented communication facility; and controlling management of the cluster from outside the cluster, and collecting statistics from the network switches based on read state messages sent from the network switches to a management controller, through the E-DFP based management plane.

12. The method of claim 11, further comprising integrating a control plane of the cluster with the E-DFP based management plane into a common server.

13. The method of claim 12, wherein the common server is configured to operate under an Open Flow protocol.

14. The method of claim 13, wherein the OpenFlow protocol is used to control the control plane.

* * * * *